(12) United States Patent
Schultz et al.

(10) Patent No.: US 7,064,948 B2
(45) Date of Patent: Jun. 20, 2006

(54) ELECTRICAL PROPERTIES AND UNIFORMITY OF BULK DEGAUSSING COILS

(75) Inventors: Robert A. Schultz, Lincoln, NE (US); LeRoy D. Thiel, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 430 days.

(21) Appl. No.: 10/394,539

(22) Filed: Mar. 21, 2003

(65) Prior Publication Data

US 2004/0184213 A1    Sep. 23, 2004

(51) Int. Cl.
*H01H 47/00* (2006.01)
(52) U.S. Cl. .................... 361/149; 361/143
(58) Field of Classification Search ............. 361/139, 361/140, 142, 143, 146–151, 267
See application file for complete search history.

(56) References Cited

U.S. PATENT DOCUMENTS

| | | | |
|---|---|---|---|
| 2,962,560 A | 11/1960 | Folse | |
| 4,617,603 A | 10/1986 | Johnson et al. | |
| 5,270,899 A | 12/1993 | Saito | |
| 5,529,703 A * | 6/1996 | Sprenger et al. | ............ 219/604 |
| 5,969,933 A | 10/1999 | Schultz et al. | |
| 2004/0112145 A1* | 6/2004 | May | ............ 73/862.331 |

OTHER PUBLICATIONS

"Helmholtz Coils", printed on Feb. 14, 2003 from the website of Walker LDJ Scientific, Inc. at http://www.walkerldjscientific.com/walker/Helmholtzcoils/index.html, 4 pages.

* cited by examiner

*Primary Examiner*—Stephen W. Jackson
*Assistant Examiner*—Danny Nguyen
(74) *Attorney, Agent, or Firm*—Fitch, Even, Tabin & Tabin

(57) ABSTRACT

A degaussing system for magnetic media is provided, the system comprising an erasing head connected to an LC circuit and the erasing head including an elongated form around which a coil is wound. The coil has two segments which are spaced apart a distance to provide adjustment of the electrical and/or magnetic properties of the coil.

6 Claims, 4 Drawing Sheets

ELECTRICAL PROPERTIES AND UNIFORMITY OF BULK DEGAUSSING COILS

BACKGROUND OF THE INVENTION

1. Field of the Invention

The present invention relates to a degaussing system for erasing of various magnetic media generally used for the storage of information through the use of special winding details in a filar wound coil or coils which provide a rotating decaying magnetic field and allow for improved field uniformity and which provide matching electrical and magnetic parameters for optimal performance.

2. Description of the Prior Art

Various degaussing systems for erasing magnetic media are known in the art. For example, although not applied to magnetic media in bulk, U.S. Pat. No. 2,962,560 discloses a system which utilizes decaying AC magnetic field as an optimal degaussing process. The system in the '560 patent applies a damped sinusoidal field along an information-bearing track of a revolving magnetic drum, exposing each point on the track to a field that reverses and decays.

In more recent art, in which individual tracks on magnetic tapes are erased, several factors including the period of a sinusoidal AC field of constant amplitude; the weakening of that field with distance from its source, such as an erase head; and the motion of tape with respect to that source; cooperate to cause the decaying AC effect, which generally serves to reduce tape noise by randomizing the state of the magnetic domains. Disk drives generally re-use tracks by overwriting them; however, application of track-width fields ranging from DC to random bit patterns are also known to have been used for information erasure.

Bulk degaussers can be used in the erasure of magnetic tape when tape recorders lack such function, in which case a decaying AC field is generally used in order to erase the tape so it can be reused. In the case of a disk drive, bulk degaussing can destroy and thereby protect information, for example, when the write mechanism fails but the read mechanism remains operational. The prior art also extends bulk degaussing to protection of information on tapes. Bulk degaussers erase media faster and more thoroughly than tape recorders and disk drives and relieve the operating stress required for recorders and drives to erase media.

Bulk degaussers generally apply large magnetic fields to media in the form of tape wound on reels in tight spirals approaching concentric cylinders or concentric circular tracks on flat disks stacked in a disk drive. The effectiveness of the intended information erasure depends both on the strength of the magnetic field and its direction or range of directions relative to the information-bearing tracks on the tape and disks. The circular direction of tracks on disks and tape reels is the single most effective direction, and degausser configurations suited to apply that direction to either form can generally apply it to the other form about as well.

The strength of the degaussing field must exceed the variable switching strength of the magnetic domains in the media. The most efficient system is one that utilizes a degaussing field which is the most uniform throughout the entire volume of the media area. This allows for operation of the coils at lower power and thus lower energy usage.

The optimal operation is also obtained when the electrical and magnetic parameters of the coil or coils are properly matched. The relationship between values of inductance (L), capacitance (C), and stray resistance (R), which is generally dominated by construction details of the coil, determines whether or not the resulting circuit discharges with an exponentially decaying sinusoidal current or not. When a coil is split into two windings, the windings should have nearly equal L, C, and R. If the two windings are of nearly equal L and C, then the natural oscillation of the coils occurs at approximately the same frequency, thereby minimizing any corrective variances required by external means. Equal L and C and similar field intensity per stored energy squared ($H/W^2$) characteristics of prior art coils also allow charging of capacitances through simple circuitry to equal potential (V) which simplifies design of external switching circuitry.

Practical windings necessarily exhibit some stray resistance (R). In order for energy in two resonant circuits having equal L and C to decay at approximately equal rates, R must be approximately equal. Windings of wire of the same gauge may have equal R when the number of turns and thus length of the coil are the same. As long as some inevitable electrical resistance remains well under a value critical to the values of capacitance and inductance, the natural transient response of such under damped second order series LCR circuitry is an exponentially decaying sinusoid where the values of inductance and resistance alone dictate the rate of decay and the values of capacitance and inductance approximately dictate the frequency of the sinusoidal oscillations; the influence of the resistance on that frequency being limited by its value well under the critical damping value.

In the prior art of bulk degaussing, essentially circular data tracks on magnetic recording tapes and disks systems commonly used phased currents in orthogonal windings where the media remains stationary and the direction of a magnetic field equal to or greater than media size rotates throughout it. Generally, short coils as depicted in U.S. Pat. No. 4,617,603 can generate magnetic fields of essentially uniform strength in the longitudinal direction of the media tracks but not everywhere in radial directions transverse to disk tracks and perpendicular to tape tracks. Short coils are more easily manufactured as they are easy to wind and match in electrical and magnetic properties; however, they cannot provide benefits of radial exposure over media sizes that approach the maximum volume capacity within the magnetic field area.

U.S. Pat. No. 5,270,899 discloses a bulk degaussing system including an erasing head to which is applied a ringing signal to generate a magnetic field for erasing information on a tape media. The system does not provide for specific matching of coils or for varying inductance for erasure. Further, the degaussing system does not provide coverage over the tape media. Prior art depicted in that patent uses an artistic technique of partial hatch on a single coil which may appear as a multiply segmented coil.

Windings that attempt to encompass the media volume more completely, as depicted in U.S. Pat. No. 5,969,933, differ greatly from each other in geometry. Therefore they can be more difficult to match in the desired magnetic and electrical characteristics such as field generation and inductance. Matching various parameters increases energy efficiency and uniform magnetic fields throughout the media area which simplifies design and manufacturing inventory.

Problems can arise when adapting the prior art to be used with a new form of magnetic media. For example, if a longer length is desired, one may be enticed to increase the winding length. However, adding turns to achieve a particular winding length can increase L much beyond the preferred value as L increases in proportion to the square of turns. Also adding turns may increase the magnetic field strength at the center of the coil to unnecessary levels. As a rule of thumb, field intensity generated by a cylindrical winding falls by 50 percent from the center of the winding to the ends of the winding. In order to assure beneficial radial field strengths at the ends of the media area, it is necessary to select operating parameters which generate high operating fields in the center region. These higher parameters increase power requirements and complicate associated switching circuitry.

Helmholz coils have been used to generate magnetic fields of increased uniformity over a specified volume. One species of Helmholz coils employs two separate identically wound coils wired in series where the mean radius is equal to the mean coil spacing. Helmholz coils are generally uniquely designed for a particular experimental or industrial purpose. The unique nature of each Helmholz coil increases the design and manufacturing costs and makes them unfeasible for practical degaussing of magnetic media.

SUMMARY OF THE INVENTION

It is an object of the present invention to provide an erasing head in a bulk degaussing system which solves various problems in the prior art. The prior art contains limitations on the effective degaussing volume within the enclosure based on the lack of uniformity of the magnetic field generated and also contained a limitation on the enclosure area based on the increasing electrical properties that would be present with a larger coil. Thus it is an object of the present invention to minimize the field non-uniformity exhibited by the prior art using orthogonal filar wound coils that only partially enclose a media volume and which are separated using nonconductive materials.

Briefly, the present invention relates to a bulk degaussing system which includes a coil energized by an LC circuit, the coil almost completely encompassing and closely conforming to various magnetic media. The coil is separated into two or more coil segments by nonmetallic materials to increase the available media size. In one embodiment of this invention, one coil is separated into two segments through the use of a nonmetallic separator thereby increasing the magnetic field while maintaining uniformity throughout this same volume.

BRIEF DESCRIPTION OF THE DRAWINGS

These and other advantages of the present invention will be readily understood with reference to the following detailed description and attached drawings, wherein.

SUMMARY DESCRIPTION OF THE INVENTION

Figure 1:
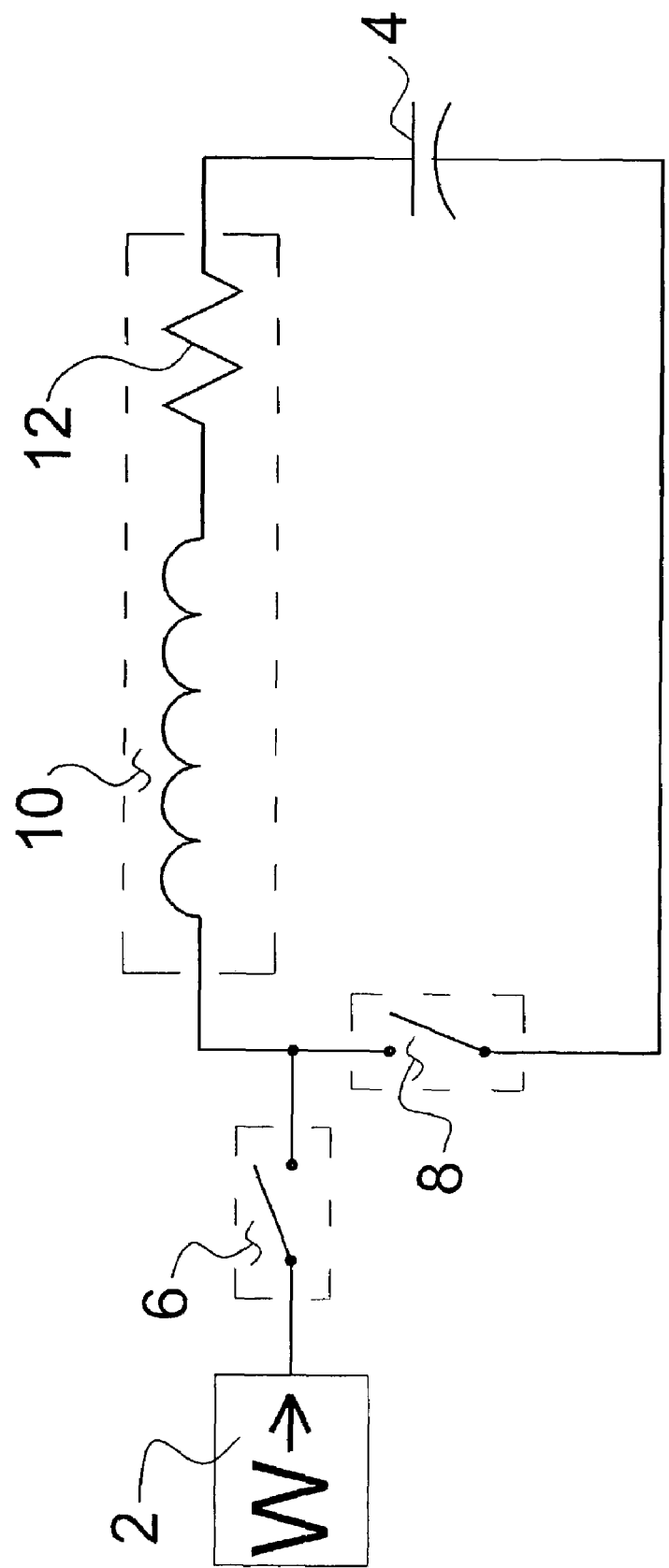
FIG. 1 illustrates the prior art of a typical degaussing LC circuit for providing a decaying magnetic field.

As shown in FIG. 1, there is shown a schematic of a resonating circuit including means 2 for delivering energy (W) to a capacitor 4 through a switching means 6. With capacitor 4 charged and switch 6 open, closure of switching means 8 causes capacitor 4 to discharge into inductor 10. The current in inductor 10 generates a magnetic field, which is designed to expose magnetic storage media to the field for information erasure. The relationship between values of inductance (L) and capacitance (C), and stray resistance (R) in resistor 12, which is generally dominated by construction details of the inductor 10, determines whether or not the resulting circuit discharges with the desired exponentially decaying sinusoidal current or not.

The present invention particularly suits embodiments of practical prior art degaussing where field-generating currents in orthogonally wound coils are maintained at phase 90 degrees to each other by various means, so that the vector sums of the fields are a single rotating and decaying field. Such embodiments require two sets of components as shown in FIG. 1 and suitable switching control means to maintain phase or correct errors.

Figure 2:
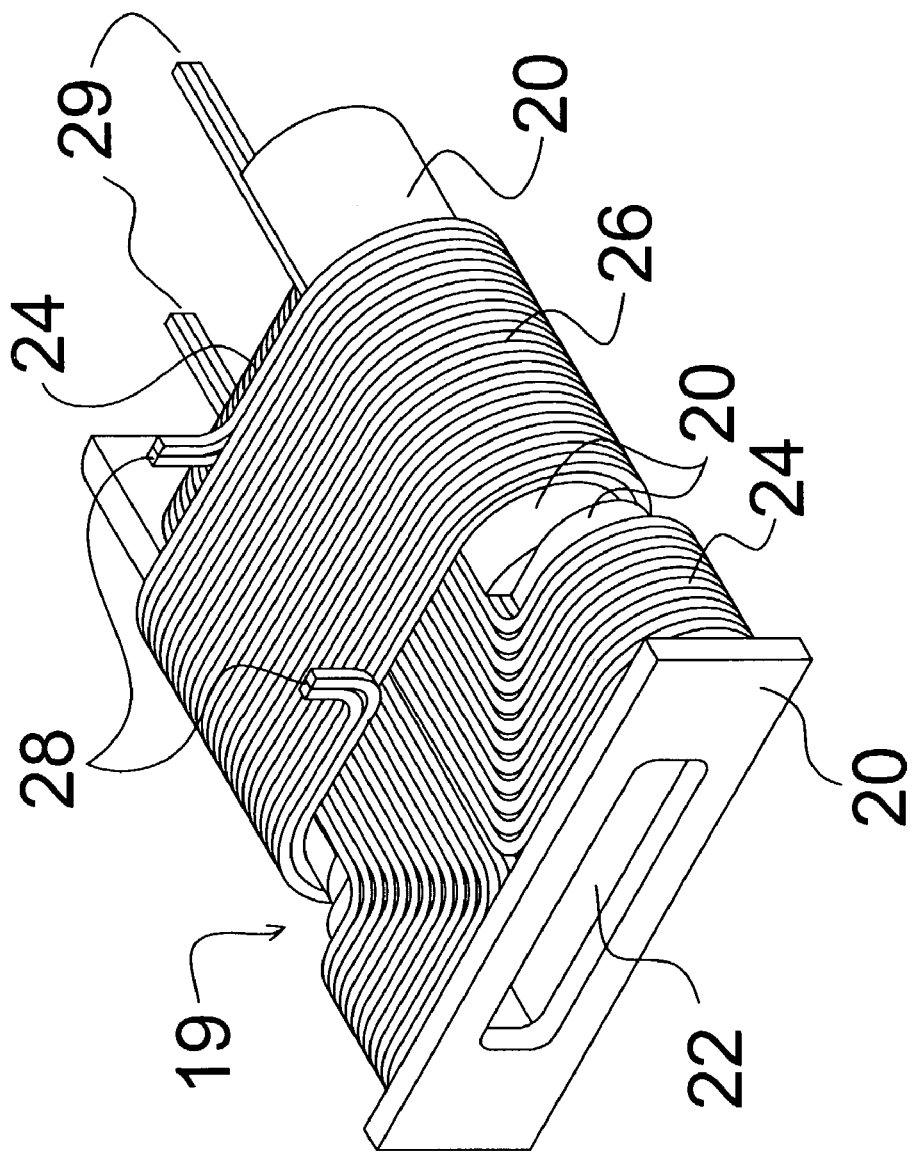
FIG. 2 illustrates in isometric view prior art of a simple coil wound over and orthogonal to a compound-wound coil with dimensional aspects of the preferred embodiment of the invention.

In FIG. 2, a degaussing head 19 is shown comprising a form 20 having an opening 22 for insertion of magnetic media. The form is elongated but can have various configurations to provide a volume for receiving various sizes and configurations of magnetic media which is in close proximity to the coil. As shown, there is an inner compound-wound coil 24 around which is disposed a simple outer coil 26 orthogonal to the inner coil 24. Coil ends 28 and 29 are connected to sets of other components shown in FIG. 1. Further details of this prior art are set forth in U.S. Pat. No. 5,969,933.

Satisfactory operation of orthogonal windings for production of rotating magnetic fields can involve multiple electrical characteristics. By way of example, if L of two windings is nearly equal, the natural oscillation of the respective coils with capacitances C of equal value yields approximately equal frequencies, with minor variance corrected against using prior art control means. Equal L and C and similar field intensity per stored energy squared ($H/W^2$) characteristics of prior art coils also allow charging of capacitances through simple circuitry to equal potential, which simplifies switching means 6.

Practical windings necessarily exhibit some stray resistance (R). In order for energy in two resonant circuits having equal L and C to decay at approximately equal rates, R must be approximately equal. When number of turns and wire gauge are similar, prior art of winding simple around compound inner turns helps equalize R.

The present invention serves to facilitate accommodation of L, C, R factors particularly for reduced volumes of present day magnetic media to achieve strength and uniformity of fields as will be seen.

However, it is to be understood this invention is not to be limited to orthogonal coils but can be applied to three coils, for example, wound at 60 degrees to each other with the prior art circuitry providing currents phased 60 degrees apart.

Further, it will be understood that the invention can be applied to a single winding in order to improve uniformity of magnetic field in a degaussing system wherein the magnetic media is rotated.

The benefits of the invention are provided by splitting prior art coil 26 into two or more segments 30 and 32 along the length of the form. Preferably, the segments are of equal width using a like number of windings of similar gauge. However, the segments can vary in width, one to the other, in the range of 1:4 to 4:1.

Figure 3:
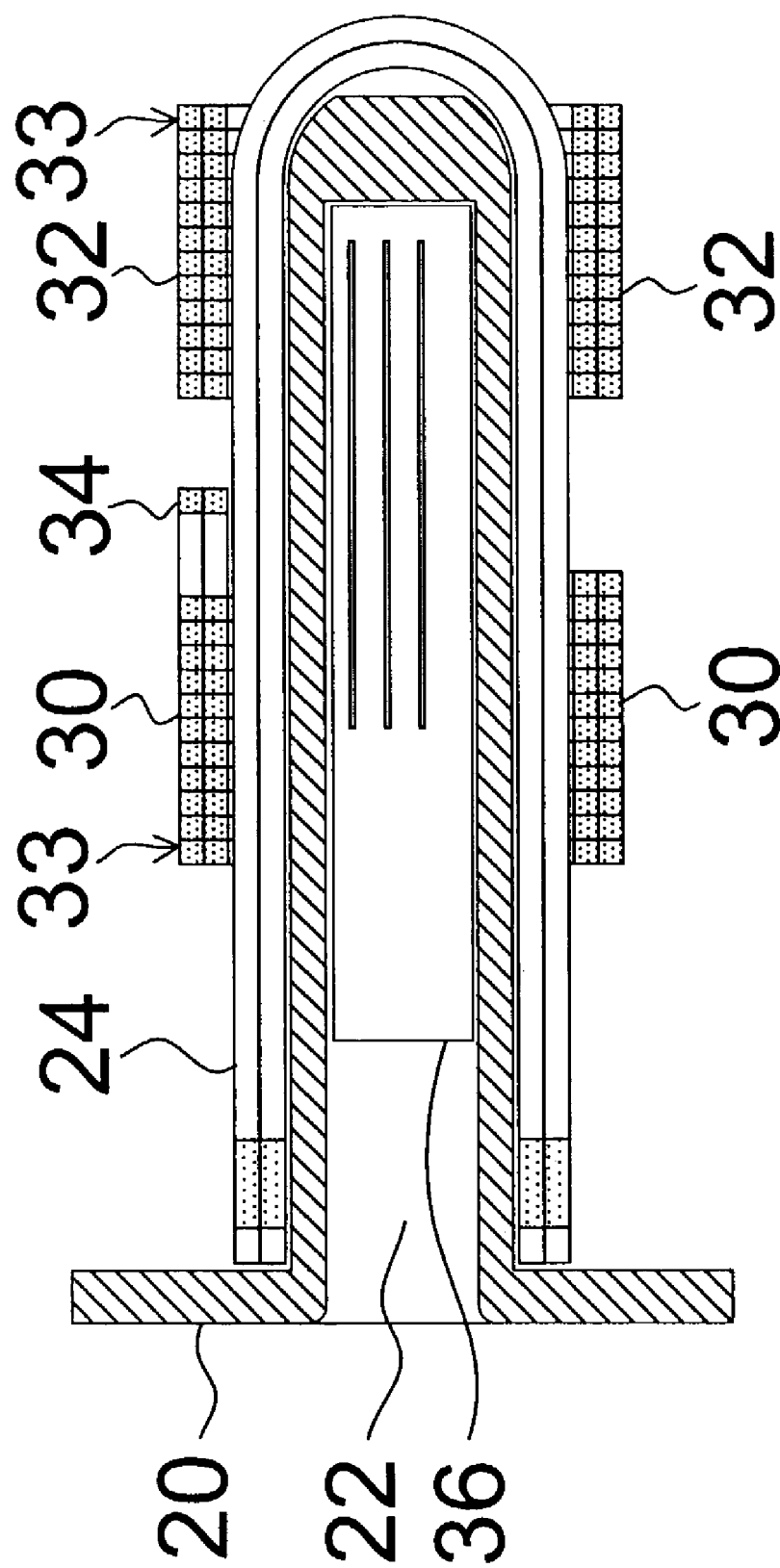
FIG. 3 illustrates in cross section a simple outer coil split axially into two segments in relation to an inner compound winding around a form containing typical magnetic storage media.
Figure 4:
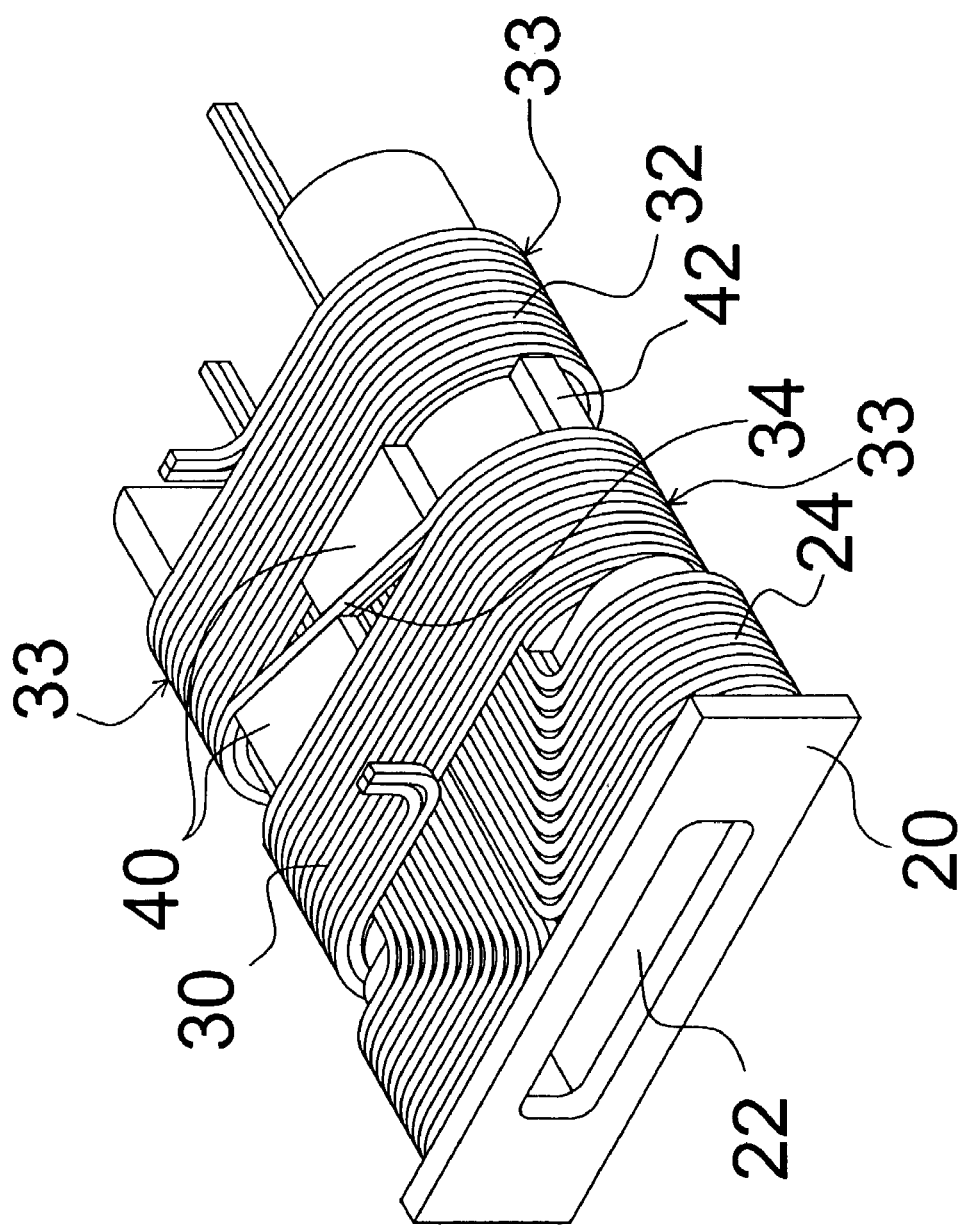
FIG. 4 illustrates in isometric view the preferred embodiment of the invention.

As shown in FIGS. 3 and 4, the segments are connected by a spiral winding 34 which wraps around the form 20 about one turn. The segments 30 and 32 are spread apart a distance to change the inductance L and field intensity per stored energy squared $H/W^2$. The spacing can vary between 3 percent to 150 percent of the width of the segments of prior art coil 26.

The segments 30 and 32 connected by the spiral winding 34 are preferably separated by a wedge insulator 40 and block insulator 42 prior to conventional varnishing and potting processes to stabilize the coil 33 against magnetic forces.

In addition to adjusting the L and $H/W^2$ factors, the separation of the segments 30 and 32 may be adjusted when two coils have different capacitances and/or resistance so as to provide like resonant frequencies of the respective coils.

It should be noted that simple LC circuits, as described above, can be replaced by more complex circuitry of the prior art.

The invention also comprises a method for manufacturing a degaussing head 19 which comprises the steps of winding a form 20 with a first filar coil 24 which provides inductance, capacitance, and resistance for a resonating circuit. The coil 24 and form are over wound with a second filar coil 26 in angular position relative to the first coil 24. The second coil 33 is split into two segments 30 and 32 a distance sufficient to approximately match the inductance, capacitance, and resistance of the first coil 24. The windings of the second coil 33 are preferably orthogonal to the first coil 24.

DETAILED DESCRIPTION OF THE PREFERRED EMBODIMENT

A preferred embodiment of the present invention system relates to a bulk degaussing system including the erasing head shown in FIGS. 3 and 4 which shows an important aspect of the invention relating to the separation of the windings of a coil which forms a portion of the bulk degaussing system in accordance with the present invention. More particularly, FIGS. 3 and 4 illustrate a coil 33 which has been split into two groups of windings 30 and 32 connected by the spiral segment 34 of one partial turn. The two groups of windings are separated by nonconductive insulators 40 and 42. FIG. 3 is a cross-section of the preferred embodiment which shows a magnetic storage media 36 inserted into a form 20 of the degaussing system. In this view it is evident that the separation of the coil into two winding segments which extend the magnetic field throughout the media area.

The splitting of the outer winding increases the length of the outer coil while still yielding the desired inductance L. This embodiment also improves uniformity of the magnetic field generated throughout the media area without adversely affecting $H/W^2$.

Introducing a single gap between sets of windings comprises a much simpler method of determining an optimum gap for desired L. The winding sections can be split by hand while observing the measurement of L to determine separation distance. Two winding sections can be packed tightly for precision and stability. The use of insulators 40 and 42 ensures that the windings are stabilized and will not move after varnishing and potting of the degaussing system.

The spiral segment 34 connecting groups of turns in an axially split coil need not be restricted to a fraction of a turn, but can approach or even exceed a full turn, for example, in fine adjustment of parameters or to realize a particularly long coil. Windings in a coil may be split to adjust parameters other than L and $H/W^2$. For example, a particular embodiment might benefit from splitting to achieve a particular $H/W^2$ characteristic in an L that differs from another coil in a bulk degausser so that with different values of C, resonant frequencies of the coil circuits are nearly equal while at equal V magnetic field strength from the two coils is also nearly equal.

As shown in FIG. 3, the L of 24 turns of the outer coil can be reduced from 68E-6 Henry to 47E-6 Henry by splitting the segments 30 and 32 of 12 turns each a distance of about 30 percent of the width of the segments. By splitting the segments, the coil width increases the coverage of the 24 turns from 4.2 inches to 5.5 inches and establishes uniformity, and only decreases $H/W^2$ to the same value of the inner compound winding. Thus, the split winding positioned over a compound inner winding generates a symmetric magnetic field about the magnetic media 36. Extending the outer winding establishes a magnetic field to accommodate larger magnetic media, as for example, the 4.9 inch long IBM 3480/3590 cartridges rather than typical 3.5 inch hard disk drives.

What is claimed is:

1. A bulk degaussing system comprising an elongated form receiving a magnetic media, a filar coil surrounding said form along its length, said coil having two segments and providing inductance to a resonating circuit and further providing a field within said form for degaussing the media, said two segments of said coil being space apart along the length of said form a distance sufficient to adjust the electrical and/or the magnetic parameters of the coil.

2. The bulk degaussing system of claim 1 wherein the spacing of said segments is adjusted for the electrical parameters of said coil.

3. The bulk degaussing system of claim 1 wherein the spacing of said coils is adjusted for the magnetic parameter of said coil.

4. A bulk degaussing system comprising an elongated form for receiving a magnetic media, a filar coil surrounding said form along its length, said coil having multiple segments and providing inductance to a resonating circuit and further providing a filed within said form for degaussing the media, said multiple segments of said coil being spaced apart along the length of said form a distance sufficient to adjust the electrical and/or the magnetic parameters of said coil.

5. The bulk degaussing system of claim 4 wherein the pacing of said segments is adjusted for the electrical parameters of said coil.

6. The bulk degaussing system of claim 4 wherein the spacing of said coils is adjusted for the magnetic parameter of said coil.

* * * * *